(12) United States Patent
Garcia Llorente et al.

(10) Patent No.: US 12,309,639 B2
(45) Date of Patent: May 20, 2025

(54) HANDLING OF SECONDARY RAT DATA USAGE FOR A UE

(71) Applicant: Telefonaktiebolaget LM Ericsson (publ), Stockholm (SE)

(72) Inventors: Jorge Garcia Llorente, Madrid (ES); Santiago Gallego Rodrigo, Getafe (ES); Ignacio Rivas Molina, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 503 days.

(21) Appl. No.: 17/311,882

(22) PCT Filed: Jan. 15, 2019

(86) PCT No.: PCT/EP2019/050954
§ 371 (c)(1),
(2) Date: Jun. 8, 2021

(87) PCT Pub. No.: WO2020/119954
PCT Pub. Date: Jun. 18, 2020

(65) Prior Publication Data
US 2022/0030465 A1    Jan. 27, 2022

(30) Foreign Application Priority Data
Dec. 10, 2018  (EP) .................... 18382905

(51) Int. Cl.
*H04W 28/086* (2023.01)
*H04W 28/02* (2009.01)
*H04W 28/08* (2023.01)

(52) U.S. Cl.
CPC ... *H04W 28/0865* (2023.05); *H04W 28/0268* (2013.01); *H04W 28/08* (2013.01); *H04W 28/0942* (2020.05)

(58) Field of Classification Search
CPC ......... H04W 28/0268; H04W 28/0865; H04W 28/0942
See application file for complete search history.

(56) References Cited

U.S. PATENT DOCUMENTS

| | | | |
|---|---|---|---|
| 2013/0183995 A1* | 7/2013 | Smith | H04W 16/14 |
| | | | 455/452.2 |
| 2014/0213256 A1 | 7/2014 | Meylan et al. | |
| 2020/0052916 A1* | 2/2020 | Kaki | H04L 41/0894 |

FOREIGN PATENT DOCUMENTS

WO    WO-2019199311 A1 *  10/2019  ............ H04W 76/10

OTHER PUBLICATIONS

Ericsson, "Pseudo-CR on Support of the Quota handling for Online Charging over Sx", 3GPP TSG CT4 Meeting #76, Dubrovnik, Croatia, Feb. 13, 2017, pp. 1-16, C4-171047, 3GPP.

(Continued)

*Primary Examiner* — Elton Williams
(74) *Attorney, Agent, or Firm* — Sonoda & Kobayashi Intellectual Property Law; Sarvajit S. Patil.

(57) ABSTRACT

There is provided mechanisms for handling secondary RAT data usage for a UE. A method is performed by a mobility node. The method comprises obtaining, from a network node, an indication of data usage for the UE using the secondary RAT. The method comprises forwarding the indication towards a policy node. The method comprises obtaining a policy decision originating from the policy node. The policy decision is based on the indication of data usage. The method comprises performing an action based on the policy decision.

14 Claims, 7 Drawing Sheets

(56) References Cited

OTHER PUBLICATIONS

Nokia et al., "Data Volume Reporting for Option 4/7—Procedure updates", Change Request 0863, 3GPP TSG-SA WG2 Meeting #129bis, West Palm Beach, US, Nov. 26, 2018, pp. 1-32, S2-1813079, 3GPP.
Huawei, "(TP for NR BL CR for TS 37.340) Data Volume Reporting in 5GG", 3GPP TSG-RAN3 Meeting #102, Spokane, US, Nov. 12, 2018, pp. 1-15, R3-187038, 3GPP.
3rd Generation Partnership Project, "3rd Generation Partnership Project; Technical Specification Group Services and System Aspects; Policy and charging control architecture (Release 15)", Technical Specification, 3GPP TS 23.203 V15.3.0, Jun. 1, 2018, pp. 1-262, 3GPP, France.
3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 15)", Technical Specification, 3GPP TS 23.401 V15.4.0, Jun. 1, 2018, pp. 1-410, 3GPP, France.
3rd Generation Partnership Project, "3rd Generation Partnership Project; Technical Specification Group Core Network and Terminals; Policy and Charging Control (PCC); Reference points (Release 15)", Technical Specification, 3GPP TS 29.212 V15.3.0, Jun. 1, 2018, pp. 1-282, 3GPP, France.
3rd Generation Partnership Project, "3rd Generation Partnership Project; Technical Specification Group Radio Access Network; Evolved Universal Terrestrial Radio Access Network (E-Utran); S1 Application Protocol (S1AP) (Release 15)", Technical Specification, 3GPP TS 36.413 V15.2.0, pp. 1-378, 3GPP, France.

* cited by examiner

HANDLING OF SECONDARY RAT DATA USAGE FOR A UE

TECHNICAL FIELD

Embodiments presented herein relate to methods, a mobility node, a policy node, computer programs, a computer program product, and a communication network for handling secondary radio access technology (RAT) data usage for a user equipment (UE).

BACKGROUND

In communications networks, there may be a challenge to obtain good performance and capacity for a given communications protocol, its parameters and the physical environment in which the communications network is deployed.

The radio access network node (such as an evolved NodeB; eNB) could be configured to control a dual connectivity radio connection that uses a combination of a fourth generation (4G) radio access network and a fifth generation (5G) radio access network with the 5G radio access network as a secondary radio access technology (RAT) using the evolved packet core (EPC) network in a Non-Standalone (NSA) configuration when the 5G-capable UEs are simultaneously associated both with eNB and a radio access network node (such as a gNodeB; gNB) in the 5G radio access network.

When it is possible to use a secondary RAT in conjunction with a 4G radio access network, the mobile network operator might activate Secondary RAT Usage Data Reporting pertaining to how much data the UE has consumed using the secondary RAT. The activation of the Secondary RAT Usage Data Reporting might occur separately from Data Volume Reporting of New Radio (NR) and Unlicensed Spectrum. Data volumes might be reported for the secondary RAT on a per Evolved Packet System (EPS) bearer basis and per time interval.

However, it is currently cumbersome to determine whether to apply any restrictions to further use of the secondary RAT for a UE or not.

Hence, there is a need for better handling the use of a secondary RAT for a UE.

SUMMARY

An object of embodiments herein is to provide efficient handling of secondary RAT data usage for a UE.

According to a first aspect there is presented a method for handling secondary RAT data usage for a UE. The method is performed by a mobility node. The method comprises obtaining, from a network node, an indication of data usage for the UE using the secondary RAT. The method comprises forwarding the indication towards a policy node. The method comprises obtaining a policy decision originating from the policy node. The policy decision is based on the indication of data usage. The method comprises performing an action based on the policy decision.

According to a second aspect there is presented a mobility node for handling secondary RAT data usage for a UE. The mobility node comprises processing circuitry. The processing circuitry is configured to cause the mobility node to obtain, from a network node, an indication of data usage for the UE using the secondary RAT. The processing circuitry is configured to cause the mobility node to forward the indication towards a policy node. The processing circuitry is configured to cause the mobility node to obtain a policy decision originating from the policy node. The policy decision is based on the indication of data usage. The processing circuitry is configured to cause the mobility node to perform an action based on the policy decision.

According to a third aspect there is presented a computer program for handling secondary RAT data usage for a UE. The computer program comprises computer program code which, when run on processing circuitry of a mobility node, causes the mobility node to perform a method according to the first aspect.

According to a fourth aspect there is presented a method for handling secondary RAT data usage for a UE. The method is performed by a policy node. The method comprises obtaining, from a mobility node, an indication of data usage for the UE using the secondary RAT. The method comprises determining a policy decision for the UE based on the indication of data usage. The method comprises providing the policy decision towards the mobility node.

According to a fifth aspect there is presented a policy node for handling secondary RAT data usage for a UE. The policy node comprises processing circuitry. The processing circuitry is configured to cause the policy node to obtain, from a mobility node, an indication of data usage for the UE using the secondary RAT. The processing circuitry is configured to cause the policy node to determine a policy decision for the UE based on the indication of data usage. The processing circuitry is configured to cause the policy node to provide the policy decision towards the mobility node.

According to an sixth aspect there is presented a computer program for handling secondary RAT data usage for a UE, the computer program comprising computer program code which, when run on processing circuitry of a policy node, causes the policy node to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

According to an eight aspect there is presented a communication network. The communication network comprises a mobility node according to the second aspect and a policy node according the fifth aspect.

Advantageously these methods, this mobility node, this policy node, these computer programs, this computer program, and this communication network provide efficient handling of secondary RAT data usage for a UE. Advantageously this enables efficient policy decisions to be made.

Advantageously these methods, this mobility node, this policy node, these computer programs, this computer program, and this communication network can be used to determine whether to apply any restrictions to further use of the secondary RAT for a UE or not.

Advantageously these methods, this mobility node, this policy node, these computer programs, this computer program, and this communication network enable dynamic policy decisions to be determined based on Secondary RAT Usage Data Reporting and enables flexible adaptation and differentiation of network access, quality of services, etc. for the UE depending on current network conditions, subscriber category subscription and data usage in the secondary RAT.

Advantageously these methods, this mobility node, this policy node, these computer programs, this computer program, and this communication network enable control over the accumulated data consumed by the UE during a period over NR as secondary RAT and enables appropriate actions, such as access control, notifications, quality of service modification or throttling, charging control, session termination, etc., to be taken based on the data usage for the UE using the secondary RAT.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
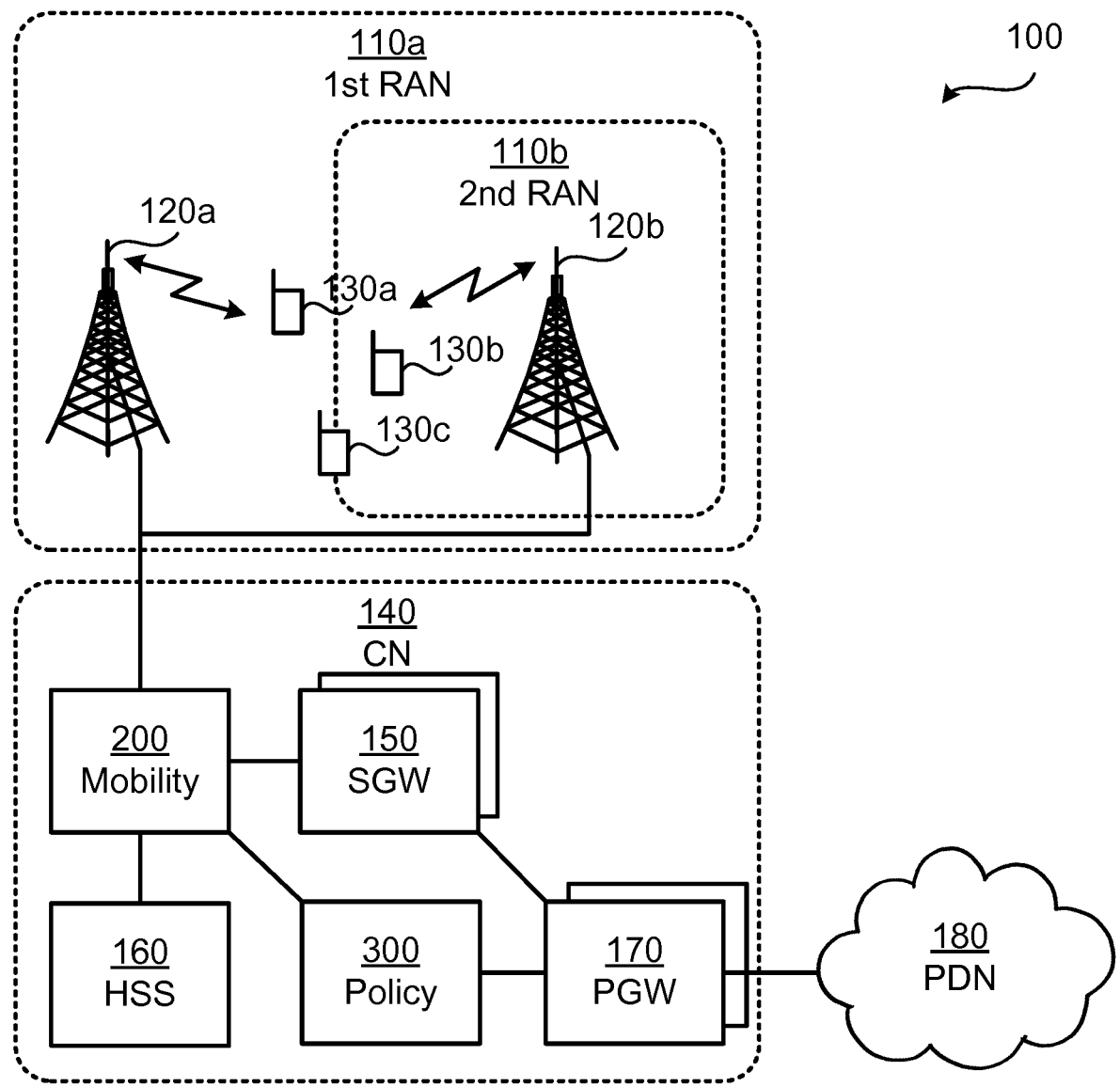
FIG. 1 is a schematic diagram illustrating a communication network according to embodiments.

FIG. 1 is a schematic diagram illustrating a communications network 100 where embodiments presented herein can be applied. The communications network 100 comprises a first radio access network (RAN) 110a comprising a network node 120a for providing network access to UEs 130a, 130b, 130c using a first radio access technology. The communications network 100 further comprises a second radio access network 110b comprising a network node 120b for providing network access to UEs 130a, 130b, 130c using a second radio access technology. In case the first radio access technology is 4G radio access, the second radio access technology could be 5G radio access. Hence, the network node 120a could provide 4G network access to UEs 130a, 130b, 130c and the network node 120b could provide 5G network access to UEs 130a, 130b, 130c. Hence, the first radio access network 110a could be a 4G radio access network and the second radio access network 110b could be a 5G radio access network.

The network node 120a could be an eNB and the network node 120b could be a gNB. Examples of UEs 130a, 130b, 130c are wireless devices, mobile stations, mobile phones, handsets, wireless local loop phones, smartphones, laptop computers, tablet computers, network equipped sensors, network equipped vehicles, and so-called Internet of Things devices. The radio access networks 110a, 110b are operatively connected to a core network (CN) 140. The core network 140 comprises at least one serving gateway (SGW) 150, at least packet data network gateway (PGW) 170, a HSS 160, a mobility node 200, and a policy node 300 having at least those operable connections and interfaces as illustrated in FIG. 1. The core network 140 is in turn operatively connected to a packet data network (PDN) 180. The UEs 130a, 130b, 130c are thereby enabled to, via the network nodes 120a, 120b, access services of, and exchange data with, the packet data network 180. In some aspects the functionality of the mobility node 200 is implemented in a Mobility Management Entity (MME) or similar. In some aspects the functionality of the policy node 300 is implemented in a Policy and Charging Rules Function (PCRF) or similar.

In the illustrative example of FIG. 1 the 5G radio access network 110b can be regarded as a secondary RAT using the core network 140 in an NSA configuration.

As disclosed above there is a need for better handling the use of a secondary RAT for a UE 130a, 130b, 130c. In this respect, the policy node 300 is the functional element that encompasses policy control decision and flow based charging control functionalities. It provides network and gating control, and manages the flow based charging. The policy node 300 could be configured to instruct the mobility node 200 to select the PGW 170 for a UE 130a, 130b, 130c when the UE 130a, 130b, 130c attaches to the radio access network 110a. The policy node 300 could further be configured to provide the mobility node 200 with RAT or Frequency Selection Priority (RFSP) and a list of event-triggers for notifications for the UE 130a, 130b, 130c.

In general terms, the policy node 300 aggregates information to and from the radio access network 110a, operational support systems, and other sources (such as portals) in real time, supporting the creation of rules and then automatically makes policy decisions for each UE 130a, 130b, 130c. However, currently, usage data reported over NR as secondary RAT is not considered for policy decisions. The embodiments disclosed herein therefore provide mechanisms to pass the Secondary RAT Usage Data Reporting from the mobility node 200 towards the policy node 300 (either directly or via the PGW 170) in order for the PRF node 300 to make dynamic policy decisions based on the Secondary RAT Usage Data Reporting. The embodiments disclosed herein in particular relate to mechanisms for handling secondary RAT data usage for a UE 130a, 130b, 130c. In order to obtain such mechanisms there is provided a mobility node 200, a method performed by the mobility node 200, a computer program product comprising code, for example in the form of a computer program, that when run on processing circuitry of the mobility node 200, causes the mobility node 200 to perform the method. In order to obtain such mechanisms there is further provided a policy node 300, a method performed by the policy node 300, and a computer program product comprising code, for example in the form of a computer program, that when run on processing circuitry of the policy node 300, causes the policy node 300 to perform the method.

Figure 2:
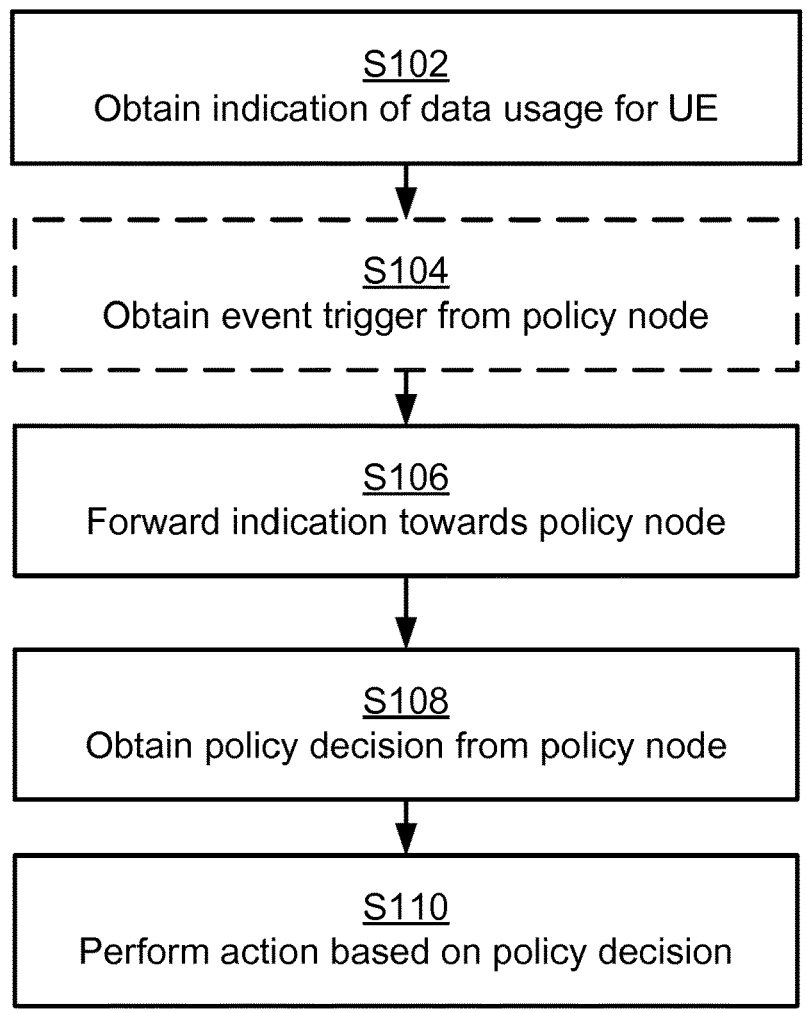
FIGS. 2 and 3 are flowcharts of methods according to embodiments.

Reference is now made to FIG. 2 illustrating a method for handling secondary RAT data usage for a UE 130*a*, 130*b*, 130*c* as performed by the mobility node 200 according to an embodiment.

As noted above, the network node 120*a* might indicate data usage for the UE 130*a*, 130*b*, 130*c* using the secondary RAT. Hence, the mobility node 200 is configured to perform step S102:

S102: The mobility node 200 obtains, from a network node 120*a*, an indication of data usage for the UE 130*a*, 130*b*, 130*c* using the secondary RAT.

In this respect, the indication of data usage might be in the form of Secondary RAT usage reporting. The indication of data usage might be provided using Si signalling messages which are either at the UE level (e.g. Path Switch Request, etc.), or at bearer level (e.g. E-RAB modification indication, Deactivate bearer response, etc.). E-RAB is short for E-UTRAN Radio Access Bearer, where E-UTRAN is short for Evolved Universal Mobile Telecommunications System (UMTS) Terrestrial Radio Access.

Since a policy decision for the UE 130*a*, 130*b*, 130*c* is to be determined by the policy node 300, the indication is forwarded towards the policy node 300. Thus, the mobility node 200 is configured to perform step S106:

S106: The mobility node 200 forwards the indication towards the policy node 300.

As will be further disclosed below, once the policy node 300 has determined a policy decision for the UE 130*a*, the policy decision is provided towards the mobility node 200. In particular, the mobility node 200 is configured to perform step S108:

S108: The mobility node 200 obtains a policy decision originating from the policy node 300. The policy decision is based on the indication of data usage.

The mobility node 200 then acts according to the policy decision. Thus, the mobility node 200 is configured to perform step S110:

S110: The mobility node 200 performs an action based on the policy decision.

Embodiments relating to further details of handling secondary RAT data usage for a UE 130*a*, 130*b*, 130*c* as performed by the mobility node 200 will now be disclosed.

There may be different ways for the UE 130*a*, 130*b*, 130*c* to access the secondary RAT and thus to consume data using the secondary RAT. Particularly, according to an embodiment, the UE 130*a*, 130*b*, 130*c* supports dual connectivity to a 4G radio access network 110*a* and a 5G radio access network 110*b*, the secondary RAT data usage pertains to data usage of the UE 130*a*, 130*b*, 130*c* in the 5G radio access network 110*b*.

There could be different ways to trigger the Secondary RAT Usage Data Reporting. In some aspects the mobility node 200 in step S106 autonomously forwards the indication towards the policy node 300. As will be further disclosed below, in other aspects the Secondary RAT Usage Data Reporting is activated by event triggers. Particularly, according to an embodiment, the mobility node 200 is configured to perform (optional) step S104:

S104: The mobility node 200 obtains an event trigger from the policy node 300 for forwarding the indication, and the indication is in step S106 forwarded in response thereto (i.e., in response to the mobility node 200 having obtained the event trigger in step S104).

There could be different types of indications of data usage that the mobility node 200 obtains in step S102. The data usage could relate to uplink and/or downlink data for the UE 130*a*, 130*b*, 130*c* using the secondary RAT. The data usage could relate to over which period of time the data was consumed using the secondary RAT. The data usage could relate to over how long period of time the data was consumed using the secondary RAT. Particularly, according to an embodiment, the indication of data usage specifies the amount of uplink and/or downlink data usage using the secondary RAT over a period of time, and/or amount of time during which the UE 130*a*, 130*b*, 130*c* has consumed data using the secondary RAT.

There may be different ways for the MME 200 to forward the indications in step S106. Particularly, according to an embodiment, the indication is forwarded in a Credit Control Request (CCR) message. In more detail, the CCR message as sent from the mobility node 200 towards the policy node 300 could have the following structure to support Secondary RAT data usage reporting from the mobility node 200:

<CC-Request> ::= < Diameter Header: 272, REQ, PXY >
[ ... ]
[ Secondary RAT Usage Report List ]

Here, Secondary RAT Usage Report List is an Attribute-Value Pair (AVP) that specifies the Secondary RAT Usage Report IE and might specify the Secondary RAT Type, for example, unlicensed or New Radio, and the data usage count for uplink and downlink and/or start and end timestamps for data usage using the Secondary RAT. A part of the reporting is also a notification of data usage using NR access as secondary RAT in an NSA configuration since data usage using NR access indeed takes place when uplink or downlink data usage is reported for the secondary RAT since the secondary RAT includes NR access.

There may be different ways for the mobility node 200 to obtain the policy decision in step S108. Particularly, according to an embodiment, the policy decision is obtained in a Credit Control Answer (CCA) message.

There could be different ways for the mobility node 200 and the policy node 300 to communicate.

In deployments in which there is a binding between Gx/Rx/Sy/Sd sessions and an Smp session, the communication between the mobility node 200 and the policy node 300 relating to the Secondary RAT Usage Data Reporting could occur over the Gx interface. Particularly, according to an embodiment, the indication is forwarded towards the policy node 300, and the policy decision is received from the policy node 300, via at least one PGW 170. The Secondary RAT Usage Data Reporting could thus occur over the Gx interface between the PGW 170 and the policy node 300 (where the mobility node 200 forwards the Secondary RAT Usage Data Reporting to the SGW 150 that in turns forwards it to the PGW 170 that in turns forwards it to the policy node 300).

In deployments in which there is not any binding between Gx/Rx/Sy/Sd sessions and an Smp session, the communication between the mobility node 200 and the policy node 300 relating to the Secondary RAT Usage Data Reporting could occur over the Diameter Smp interface. Thus, in some aspects the mobility node 200 and the policy node 300 communicate over a Diameter Smp interface. Particularly, according to an embodiment, the indication is forwarded (as in step S106) and the policy decision is obtained (as in step s108) over a Diameter Smp interface between the mobility node 200 and the policy node 300.

If the policy decision implies, for instance, access restriction to Dual Connectivity with NR (DCNR), then the mobility node 200 needs to forward this information to the network node 120a. That is, according to an embodiment, performing the action involves the mobility node 200 to forward the policy decision towards the network node 120a.

Figure 3:
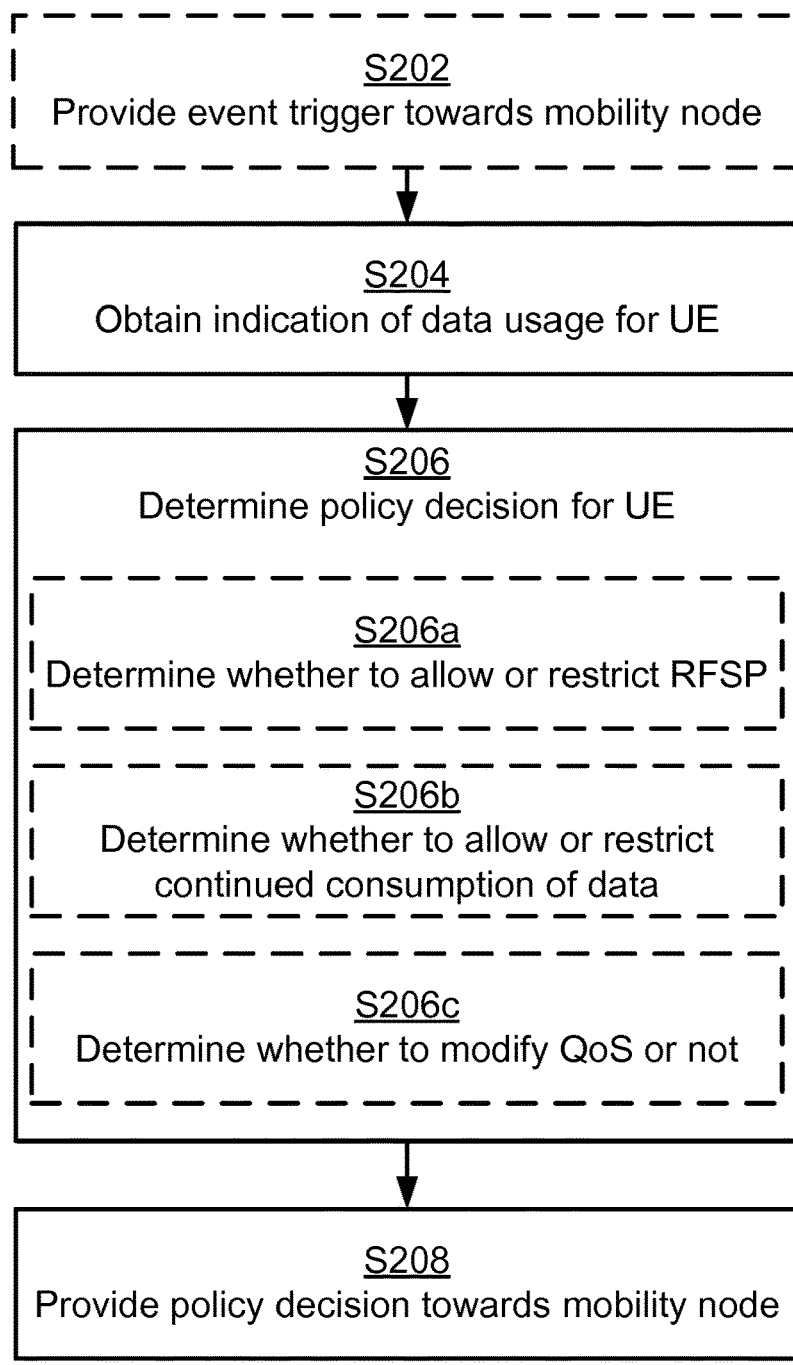

Reference is now made to FIG. 3 illustrating a method for handling secondary RAT data usage for a UE 130a, 130b, 130c as performed by the policy node 300 according to an embodiment.

As disclosed above, the mobility node 200 forwards the indication of data usage for the UE 130a, 130b, 130c using the secondary RAT towards the policy node 300. Hence, the policy node 300 is configured to perform step S204:

S204: The policy node 300 obtains, from the mobility node 200, an indication of data usage for the UE 130a, 130b, 130c using the secondary RAT.

A dynamic policy decision is then made by the policy node 300. Particularly, the policy node 300 is configured to perform step S206:

S206: The policy node 300 determines a policy decision for the UE 130a, 130b, 130c based on the indication of data usage.

In general terms, one policy decision is determined per individual UE 130a, 130b, 130c. The policy decision is then forwarded towards the mobility node 200. Thus, the policy node 300 is configured to perform step S208:

S208: The policy node 300 provides the policy decision towards the mobility node 200. As will be disclosed below, the policy decision might either be provided to the mobility node 200 over a direct interface between the policy node 300 and the mobility node 200 or provided to the mobility node 200 via the PGW 170 and the SGW 150.

Embodiments relating to further details of handling secondary RAT data usage for a UE 130a, 130b, 130c as performed by the policy node 300 will now be disclosed.

As disclosed above, according to an embodiment the indication of data usage specifies the amount of uplink and/or downlink data usage using the secondary RAT over a period of time, and/or amount of time during which the UE 130a, 130b, 130c has consumed data using the secondary RAT. Any, all, or a subset of these parameters could thus be taken into account when determining the policy decision.

As disclosed above, according to an embodiment, the UE 130a, 130b, 130c supports dual connectivity to a 4G radio access network 110a and a 5G radio access network 110b, and the secondary RAT data usage pertains to data usage of the UE 130a, 130b, 130c in the 5G radio access network 110b.

In some aspects the Secondary RAT Usage Data Reporting is activated by event triggers sent by the policy node 300 towards the mobility node 200 (either directly or via the PGW 170 and SGW 150). Particularly, according to an embodiment the policy node 300 is configured to perform (optional) step S202:

S202: The policy node 300 provides an event trigger towards the mobility node 200 for obtaining the indication, and the indication is obtained (as in step S104) in response thereto (i.e., in response to the policy node 300 having provided the event trigger in step S202). The event trigger might be included in a CCA message (such as in a CCA-I message (I for Initial)) in order for the policy node 300 to subscribe to Secondary RAT Usage events from the mobility node 200. In more detail, the CCA message as sent from the policy node 300 towards the mobility node 200 could have the following structure:

```
<CC-Answer> ::= < Diameter Header: 272, PXY >
    [ ... ]
        [ Event-trigger ]
```

Here, Event-trigger is an AVP that indicates that the policy node 300 requests to subscribe to Secondary RAT Usage events from the mobility node 200.

There could be different policy decisions that are determined in step S206.

The policy decision could pertain to any of RAT/frequency selection priority (RFSP) selection, NR access control as secondary RAT in an NSA configuration, and Quality of Service (QoS) modification or service access control, or any combination thereof. For example, the policy decisions could involve whether to restrict or allow NR access control as a secondary RAT using EPC in an NSA configuration.

In addition to forwarding the policy decision to the mobility node 200, the PGW 170 might implement part of the policy decision itself (e.g. to throttle the traffic or to perform access control, etc.) based on the data usage in secondary RAT reported by the mobility node 200 to the policy node 300. In this respect, the information about data usage using the secondary RAT can by the policy node 300 be used when determining policies for the UE 130a, 130b, 130c.

In some aspects, the policy decision involves RFSP selection for the UE 130a, 130b, 130c. Particularly, according to an embodiment the policy node 300 is configured to perform (optional) step S206a as part of determining the policy decision in step S206:

S206a: The policy node 300 determines whether to allow or restrict support for RFSP for the UE 130a, 130b, 130c.

In this respect, if a UE 130a, 130b, 130c surpasses a configured threshold of data usage on the secondary RAT the policy node 300 might decide whether to allow or restrict support for RFSP, which is used to apply specific Radio Resource Management strategies for the UE 130a, 130b, 130c. The policy node 300 might provide different RFSP identities when the data usage is below and above the configured threshold. This can be done in the policy node 300 via configuration of policies to determine the RFSP using the data usage in the secondary RAT as part of the input data for the policy decision.

In some aspects, the policy decision involves NR access control for the UE 130a, 130b, 130c. Particularly, according to an embodiment the policy node 300 is configured to perform (optional) step S206b as part of determining the policy decision in step S206:

S206b: The policy node 300 determines whether to, for the UE 130a, 130b, 130c, allow or restrict continued consumption of data using the secondary RAT. In some aspects, the policy decision involves a possible QoS modification for the UE 130a, 130b, 130c.

In this respect, if a UE 130a, 130b, 130c surpasses a configured threshold of data usage on the secondary RAT the policy node 300 might decide to disallow the traffic on the secondary RAT. In this way, the policy node 300 might allow data usage on the secondary RAT only when the data usage is below the configured threshold. This can be done in the policy node 300 via configuration of policies to allow or disallow the use of the secondary RAT using the data usage in the secondary RAT as part of the input data for the policy decision.

Particularly, according to an embodiment the policy node 300 is configured to perform (optional) step S206*c* as part of determining the policy decision in step S206:

S206*c*: The policy node 300 determines whether to, for the UE 130*a*, 130*b*, 130*c*, modify QoS or not.

In this respect, if a UE 130*a*, 130*b*, 130*c* surpasses a configured threshold of data usage on the secondary RAT a different QoS profile can be applied that reduces the priority of the traffic for the UE 130*a*, 130*b*, 130*c* or handles the traffic for the UE 130*a*, 130*b*, 130*c* in a best effort way. In this way, the policy node 300 can apply different QoS profiles where, for example, the bandwidth is guaranteed when the data usage is below the configured threshold but is handled in a best effort mode when the data usage is above the threshold. This can be done in the policy node 300 via configuration of policies to apply different QoS profiles using the data usage in the secondary RAT as part of the input data for the policy decision.

In cases where step S206*c* is performed, the policy decision is sent towards the mobility node 200 via the PGW 170.

In some aspects, the policy decision further depends on the subscription category of the UE 130*a*, 130*b*, 130*c*. Particularly, according to an embodiment, the UE 130*a*, 130*b*, 130*c* is associated with a subscriber category, and the policy decision further is determined based on the subscriber category. The subscriber category might thus be taken into consideration when determining the policy decision according to any of steps S206, S206*a*, S206*b*, and S206*c*.

There might be different ways for policy node 300 to obtain the indication of data usage from the mobility node 200 in step S204. As above, according to an embodiment, the indication is obtained in CCR message.

There might be different ways for policy node 300 to provide the policy decision towards the mobility node 200 in step S208. As above, according to an embodiment, the policy decision is provided in a CCA message.

As above, in some aspects the mobility node 200 and the policy node 300 communicate via a PGW 170 and thus in some aspects the indication is obtained (as in step S204) from the mobility node 200 and the policy decision is provided (as in step S208) towards the mobility node 200 via the PGW 170 and the SGW 150.

As above, in some aspects the mobility node 200 and the policy node 300 communicate via the PGW 170 and the SGW 150. Particularly, according to an embodiment, the indication is obtained from the mobility node 200, and wherein the policy decision is provided towards the mobility node 200, via at least one packet gateway, PGW 170. In this case, the indication and the policy decision are sent over the Gx interface.

As above, in some aspects the mobility node 200 and the policy node 300 communicate over a Diameter Smp interface. Particularly, according to an embodiment, the indication is obtained (as in step S204) and the policy decision is provided (as in step S208) over a Diameter Smp interface between the policy node 300 and the mobility node 200.

Figure 4:
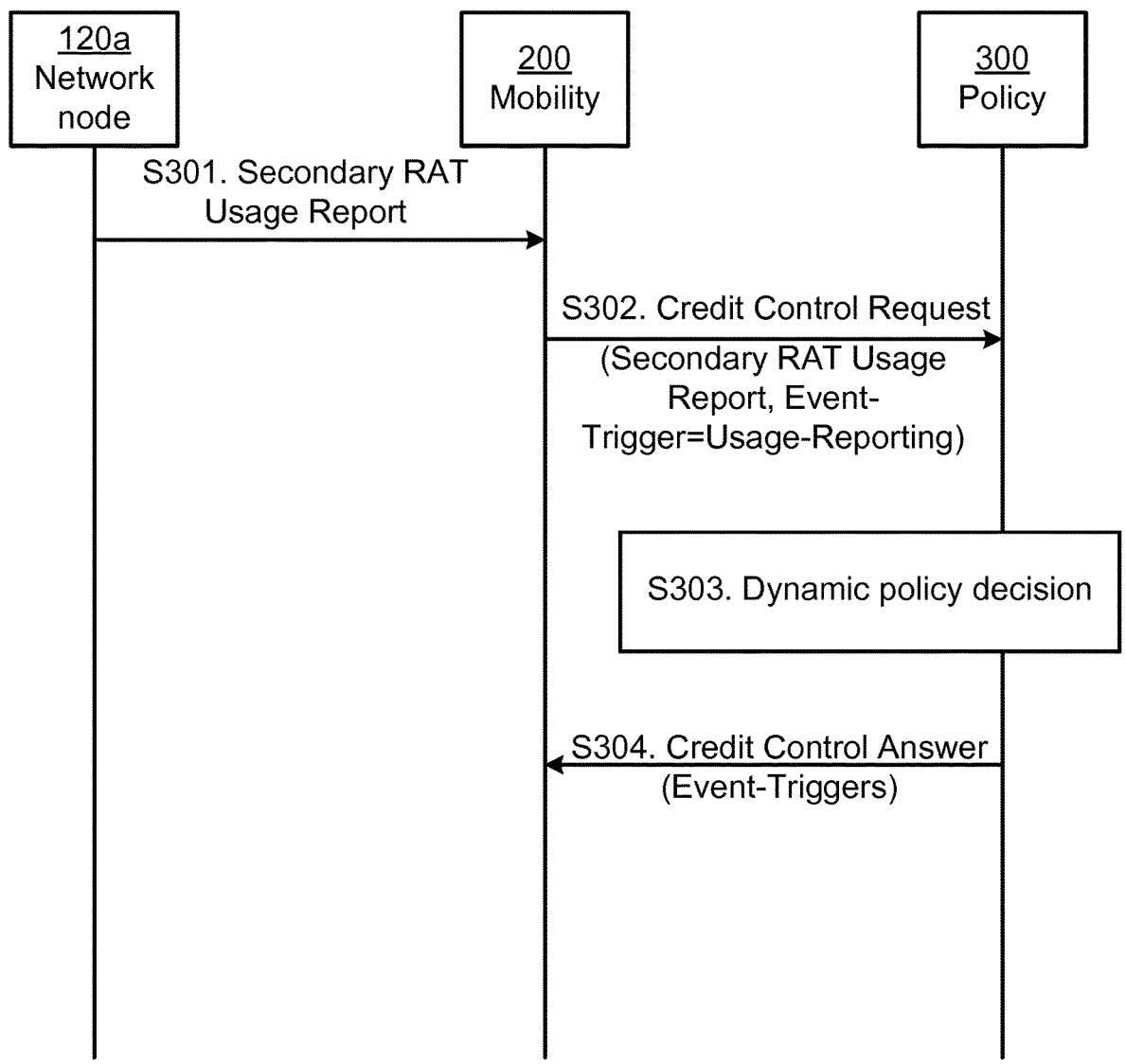
FIGS. 4 and 5 are signalling diagrams according to embodiments.

A first particular embodiment for handling secondary RAT data usage for a UE 130*a*, 130*b*, 130*c* based on at least some of the above disclosed embodiments will now be disclosed in detail with reference to the signalling diagram of FIG. 4. In this embodiment the mobility node 200 and the policy node 300 communicate directly with each other, such as over the Diameter Smp interface.

S301: The network node 120*a* sends a Secondary RAT Usage Report that indicate data usage for the UE 130*a*, 130*b*, 130*c* using the secondary RAT. The mobility node 200 thereby obtains, from the network node 120*a*, an indication of data usage for the UE 130*a*, 130*b*, 130*c* using the secondary RAT.

S302: The mobility node 200 sends a CCR message comprising the Secondary RAT Usage Report for the event trigger Usage reporting to the policy node 300. The mobility node 200 thereby forwards the indication towards the policy node 300. It is here assumed that a previous exchange of CCR-I and CCA-I (I for Initial) messages has occurred between the policy node 300 and the mobility node 200 where the policy node 300 has sent the event trigger for Usage Reporting to the mobility node 200.

S303: The policy node 300 determines a policy decision for the UE 130*a*, 130*b*, 130*c* based on the indication of data usage.

S304: The policy node 300 sends a CCA message comprising the policy decision and an event trigger for continued subscription of Secondary RAT Usage Reports to the mobility node 200. The policy node 300 thereby provides the policy decision towards the mobility node 200 and provides an event trigger towards the mobility node 200 for obtaining further indications of data usage for the UE 130*a*, 130*b*, 130*c* using the secondary RAT.

Figure 5:
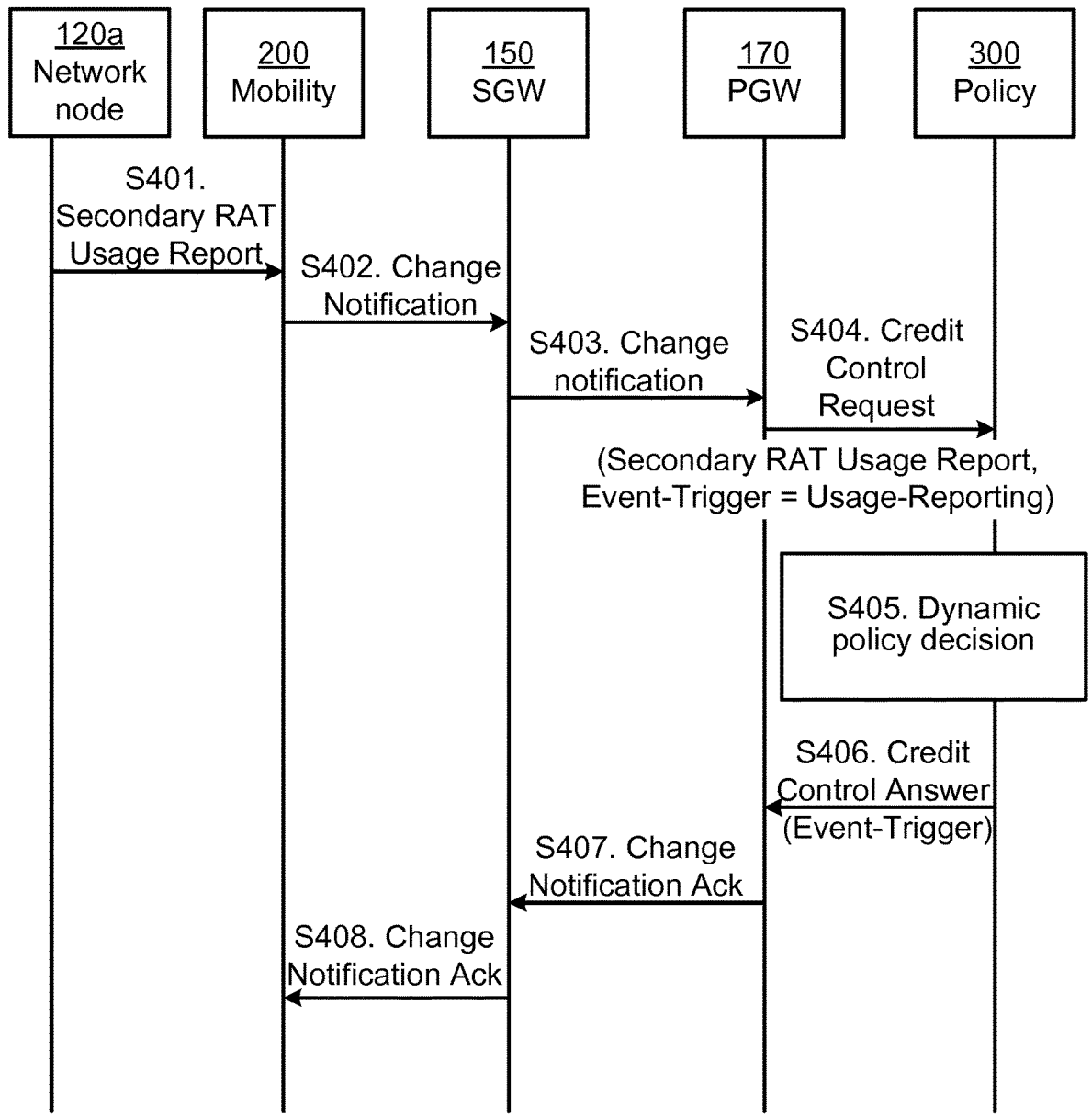

A second particular embodiment for handling secondary RAT data usage for a UE 130*a*, 130*b*, 130*c* based on at least some of the above disclosed embodiments will now be disclosed in detail with reference to the signalling diagram of FIG. 5. In this embodiment the mobility node 200 and the policy node 300 communicate with each other via the SGW 150 and the PGW 170, such as over the Gx interface.

S401: The network node 120*a* sends a Secondary RAT Usage Report that indicate data usage for the UE 130*a*, 130*b*, 130*c* using the secondary RAT. The mobility node 200 thereby obtains, from the network node 120*a*, an indication of data usage for the UE 130*a*, 130*b*, 130*c* using the secondary RAT.

S402: The mobility node 200 sends a change notification message to the SGW 150, where the change notification message comprises the indication of data usage for the UE 130*a*, 130*b*, 130*c* using the secondary RAT.

S403: The SGW 150 forwards the change notification message to the PGW 170.

S404: The PGW 170 sends a CCR message to the PCR node 300, where the CCR message comprises the indication of data usage for the UE 130*a*, 130*b*, 130*c* using the secondary RAT. The policy node 300 thereby obtains the indication of data usage for the UE 130*a*, 130*b*, 130*c* using the secondary RAT as originating from the mobility node 200 via the SGW 150 and the PGW 170. It is here assumed that a previous exchange of CCR-I and CCA-I (I for Initial) messages has occurred between the policy node 300 and the mobility node 200 where the policy node 300 has sent the event trigger for Usage Reporting to the mobility node 200.

S405: The policy node 300 determines a policy decision for the UE 130*a*, 130*b*, 130*c* based on the indication of data usage.

S406: The policy node 300 sends a CCA message comprising the policy decision and an event trigger for continued subscription of Secondary RAT Usage Reports to the PGW 170. The policy node 300 thereby provides the policy decision towards the mobility node 200 and provides an event trigger towards the mobility node 200 for obtaining further indications of data usage for the UE 130*a*, 130*b*, 130*c* using the secondary RAT.

S407: The PGW 170 sends a change notification acknowledgement (Ack) message to the SGW 150 comprising the policy decision and an event trigger for continued subscription of Secondary RAT Usage Reports.

S408: The SGW 150 forwards the change notification acknowledgement message to the mobility node 200. The mobility node 200 thereby obtains the policy decision and the event trigger as originating from the policy node 300.

Figure 6:
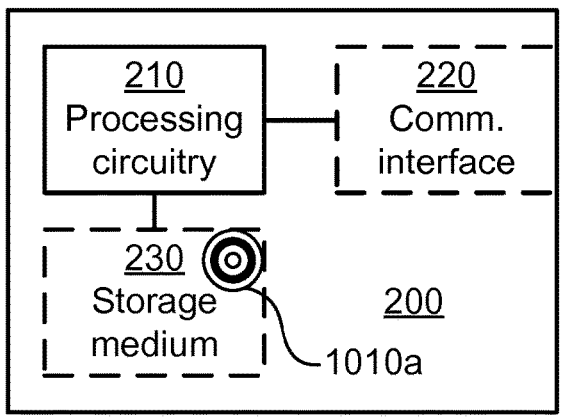
FIG. 6 is a schematic diagram showing functional units of a mobility node according to an embodiment.

FIG. 6 schematically illustrates, in terms of a number of functional units, the components of a mobility node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the mobility node 200 to perform a set of operations, or steps, as disclosed above. For example, the storage medium 230 may store the set of operations, and the processing circuitry 210 may be configured to retrieve the set of operations from the storage medium 230 to cause the mobility node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The mobility node 200 may further comprise a communications interface 220 for communications with other nodes, entities, functions, and devices of the communication network 100. As such the communications interface 220 may comprise one or more transmitters and receivers, comprising analogue and digital components.

The processing circuitry 210 controls the general operation of the mobility node 200 e.g. by sending data and control signals to the communications interface 220 and the storage medium 230, by receiving data and reports from the communications interface 220, and by retrieving data and instructions from the storage medium 230. Other components, as well as the related functionality, of the mobility node 200 are omitted in order not to obscure the concepts presented herein.

Figure 7:
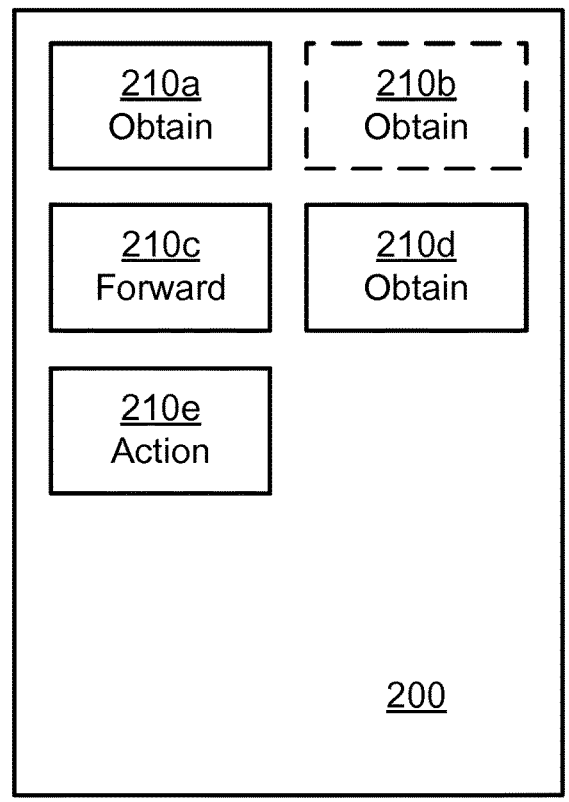
FIG. 7 is a schematic diagram showing functional modules of a mobility node according to an embodiment.

FIG. 7 schematically illustrates, in terms of a number of functional modules, the components of a mobility node 200 according to an embodiment. The mobility node 200 of FIG. 7 comprises a number of functional modules; an obtain module 210a configured to perform step S102, a forward module 210c configured to perform step S106, an obtain module 210d configured to perform step S108, and an action module 210e configured to perform step S110. The mobility node 200 of FIG. 7 may further comprise a number of optional functional modules, such an obtain module 210b configured to perform step S104. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the mobility node 200 as disclosed herein.

Figure 8:
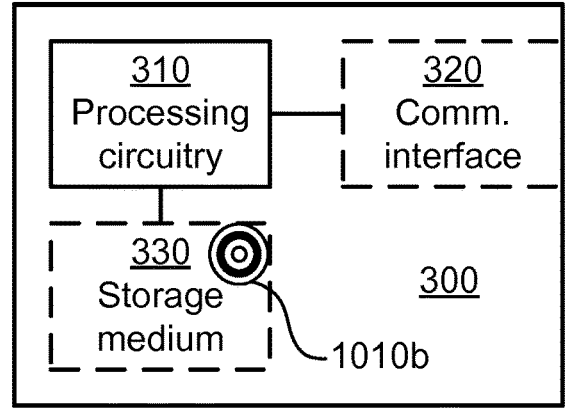
FIG. 8 is a schematic diagram showing functional units of a policy node according to an embodiment.

FIG. 8 schematically illustrates, in terms of a number of functional units, the components of a policy node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 110b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the policy node 300 to perform a set of operations, or steps, as disclosed above. For example, the storage medium 330 may store the set of operations, and the processing circuitry 310 may be configured to retrieve the set of operations from the storage medium 330 to cause the policy node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The policy node 300 may further comprise a communications interface 320 for communications with other nodes, entities, functions, and devices of the communication network 100. As such the communications interface 320 may comprise one or more transmitters and receivers, comprising analogue and digital components.

The processing circuitry 310 controls the general operation of the policy node 300 e.g. by sending data and control signals to the communications interface 320 and the storage medium 330, by receiving data and reports from the communications interface 320, and by retrieving data and instructions from the storage medium 330. Other components, as well as the related functionality, of the policy node 300 are omitted in order not to obscure the concepts presented herein.

Figure 9:
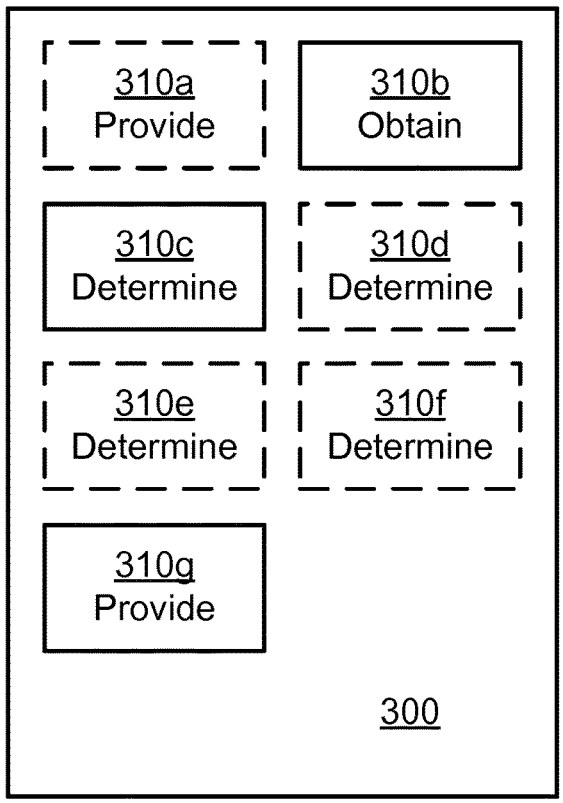
FIG. 9 is a schematic diagram showing functional modules of a policy node according to an embodiment.

FIG. 9 schematically illustrates, in terms of a number of functional modules, the components of a policy node 300 according to an embodiment. The policy node 300 of FIG. 9 comprises a number of functional modules; an obtain module 310b configured to perform step S204, a determine module 310c configured to perform step S106, and a provide module 310g configured to perform step S208. The policy node 300 of FIG. 9 may further comprise a number of optional functional modules, such as any of a provide module 310a configured to perform step S202, a determine module 310d configured to perform step S206a, a determine module 310e configured to perform step S206b, and a determine module 310f configured to perform step S206c. In general terms, each functional module 310a-310g may be implemented in hardware or in software. Preferably, one or more or all functional modules 310a-310g may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310g and to execute these instructions, thereby performing any steps of the policy node 300 as disclosed herein.

The mobility node 200 and/or policy node 300 may be provided as a standalone device or as a part of at least one further device. For example, the mobility node 200 and/or policy node 300 may be provided in a node of the core network 140. Alternatively, functionality of the mobility node 200 and/or policy node 300 may be distributed between at least two devices, or nodes. These at least two nodes, or devices, may either be part of the same network part (such as the core network 140) or may be spread between at least two such network parts.

Thus, a first portion of the instructions performed by the mobility node 200 and/or policy node 300 may be executed in a first device, and a second portion of the of the instructions performed by the mobility node 200 and/or policy node 300 may be executed in a second device; the herein disclosed embodiments are not limited to any particular number of devices on which the instructions performed by the mobility node 200 and/or policy node 300 may be executed. Hence, the methods according to the herein disclosed embodiments are suitable to be performed by a mobility node 200 and/or policy node 300 residing in a cloud computational environment. Therefore, although a single processing circuitry 210, 310 is illustrated in FIGS. 6 and 8 the processing circuitry 210, 310 may be distributed among a plurality of devices, or nodes. The same applies to the functional modules 210a-210e, 310a-310g of FIGS. 7 and 9 and the computer programs 1020a, 1020b of FIG. 10.

Figure 10:
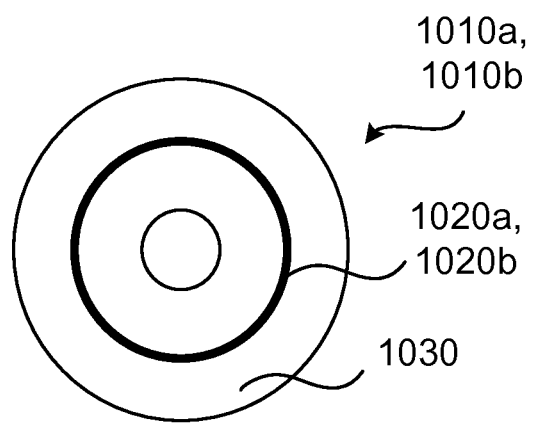
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the mobility node 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the policy node 300 as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of handling secondary radio access technology (RAT) data usage for a User Equipment (UE), the method being performed by a mobility node, the method comprising:
    obtaining, from a network node, an indication of data usage for the UE using the secondary RAT;
    obtaining an event trigger from a policy node for forwarding the indication;
    responsive to obtaining the event trigger, forwarding the indication towards the policy node;
    obtaining a policy decision originating from the policy node, the policy decision being based on the indication of data usage; and
    performing an action based on the policy decision,
    wherein the policy node comprises a Policy and Charging Rules Function (PCRF),
    wherein the mobility node comprises a Mobility Management Entity (MME),
    wherein the indication is forwarded towards the policy node,
    wherein the policy decision is received from the policy node, via at least one packet gateway, PGW, and
    wherein the at least one PGW implements part of the policy decision by throttling traffic or performing access control.

2. The method of claim 1, wherein the UE supports dual connectivity to a 4G radio access network and a 5G radio access network, and wherein the secondary RAT data usage pertains to data usage of the UE in the 5G radio access network.

3. The method of claim 1, wherein the indication of data usage specifies amount of uplink and/or downlink data usage using the secondary RAT over a period of time, and/or amount of time during which the UE has consumed data using the secondary RAT.

4. The method of claim 1, wherein:
    the indication is forwarded in a Credit Control Request (CCR) message; and
    the policy decision is obtained in a Credit Control Answer (CCA) message.

5. The method of claim 1, wherein performing the action involves forwarding the policy decision towards the network node via the at least one PGW.

6. A method of handling secondary radio access technology (RAT) data usage for a User Equipment (UE), the method being performed by a policy node, the method comprising:
    providing an event trigger towards a mobility node for obtaining an indication of data usage for the UE using a secondary RAT;
    obtaining, from a mobility node, the indication;
    determining a policy decision for the UE based on the indication of data usage; and
    providing the policy decision towards the mobility node,
    wherein the policy node comprises a Policy and Charging Rules Function (PCRF),
    wherein the mobility node comprises a Mobility Management Entity (MME),
    wherein the indication is obtained from the mobility node,
    wherein the policy decision is provided towards the mobility node, via at least one packet gateway (PGW), and wherein the at least one PGW implements part of the policy decision by throttling traffic or performing access control.

7. The method of claim 6, wherein the UE supports dual connectivity to a 4G radio access network and a 5G radio access network, and wherein the secondary RAT data usage pertains to data usage of the UE in the 5G radio access network.

8. The method of claim 6, wherein determining the policy decision comprises determining whether to allow or restrict support for RAT/Frequency Selection Priority (RFSP) for the UE.

9. The method of claim 6, wherein determining the policy decision comprises determining whether to, for the UE, allow or restrict continued consumption of data using the secondary RAT.

10. The method of claim 6, wherein determining the policy decision comprises determining whether to, for the UE, modify quality of service, QoS, or not.

11. The method of claim 6, wherein the UE is associated with a subscriber category, and wherein the policy decision is further determined based on the subscriber category.

12. The method of claim 6, wherein:
the indication is obtained in a Credit Control Request (CCR) message; and
the policy decision is provided in a Credit Control Answer (CCA) message.

13. A mobility node configured to handle secondary radio access technology (RAT) data usage for a User Equipment (UE), the mobility node comprising processing circuitry configured to control the mobility node to:
obtain, from a network node, an indication of data usage for the UE using the secondary RAT;
obtaining an event trigger from a policy node for forwarding the indication;
responsive to obtaining the event trigger, forward the indication towards the policy node;
obtain a policy decision originating from the policy node, the policy decision being based on the indication of data usage; and
perform an action based on the policy decision,
wherein the policy node comprises a Policy and Charging Rules Function (PCRF),
wherein the mobility node comprises a Mobility Management Entity (MME),
wherein the indication is forwarded towards the policy node,
wherein the policy decision is received from the policy node, via at least one packet gateway, PGW, and
wherein the at least one PGW implements part of the policy decision by throttling traffic or performing access control.

14. A policy node configured to handle secondary radio access technology (RAT) data usage for a User Equipment (UE), the policy node comprising processing circuitry configured to control the policy node to:
providing an event trigger towards a mobility node for obtaining an indication of data usage for the UE using a secondary RAT;
obtain, from a mobility node, the indication;
determine a policy decision for the UE based on the indication of data usage; and
provide the policy decision towards the mobility node,
wherein the policy node comprises a Policy and Charging Rules Function (PCRF),
wherein the mobility node comprises a Mobility Management Entity (MME),
wherein the indication is obtained from the mobility node,
wherein the policy decision is provided towards the mobility node, via at least one packet gateway (PGW), and
wherein the at least one PGW implements part of the policy decision by throttling traffic or performing access control.

\* \* \* \* \*